United States Patent [19]

Gumbs

[11] Patent Number: 5,211,433
[45] Date of Patent: May 18, 1993

[54] DOME CLAMP APPARATUS

[76] Inventor: Alan E. Gumbs, 456 Thalia Rd., Virginia Beach, Va. 23452

[21] Appl. No.: 868,674

[22] Filed: Apr. 15, 1992

[51] Int. Cl.$^5$ .................. B60D 17/12; E05C 19/18
[52] U.S. Cl. .................. 292/256; 292/259 R; 105/377; 220/314
[58] Field of Search .................. 105/377; 220/314; 292/256, 256.5, 256.71, 256.73, 259

[56] References Cited

U.S. PATENT DOCUMENTS

| | | | |
|---|---|---|---|
| 193,549 | 7/1877 | Pope | 292/259 |
| 463,253 | 11/1891 | Moore | 292/259 |
| 1,739,911 | 12/1929 | McMurray | 292/259 |
| 1,768,188 | 6/1930 | Champion, Jr. | 292/256 |
| 1,825,726 | 10/1931 | Gredell | 292/259 |
| 2,526,050 | 10/1950 | Schweiso et al. | 292/259 |
| 2,542,621 | 2/1951 | Bober | 292/256 |
| 2,565,964 | 8/1951 | Graham et al. | 292/256 |
| 4,461,219 | 7/1984 | Bateson | 105/377 |
| 4,920,747 | 5/1990 | Haney | 220/314 |

FOREIGN PATENT DOCUMENTS 766949  9/1967  Canada .................. 292/256

Primary Examiner—Eric K. Nicholson
Attorney, Agent, or Firm—Leon Gilden

[57] ABSTRACT

A dome clamp arranged for mounting to the lid plates of a truck tank-trailer arrangement includes a plurality of confronting L-shaped legs mounted to a support beam, with the support beam including a slot having a slot clamp slidably directed therethrough to provide for clamping of the structure to the lid plates.

4 Claims, 4 Drawing Sheets

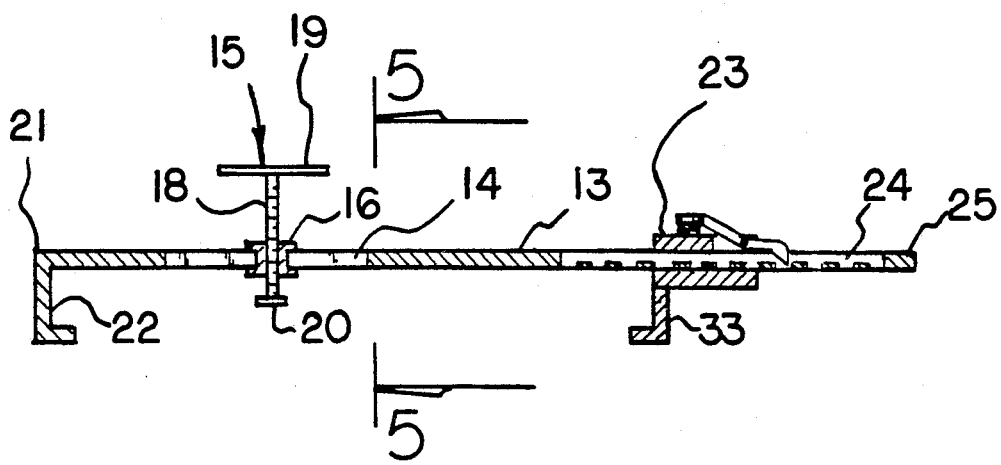
FIG 3
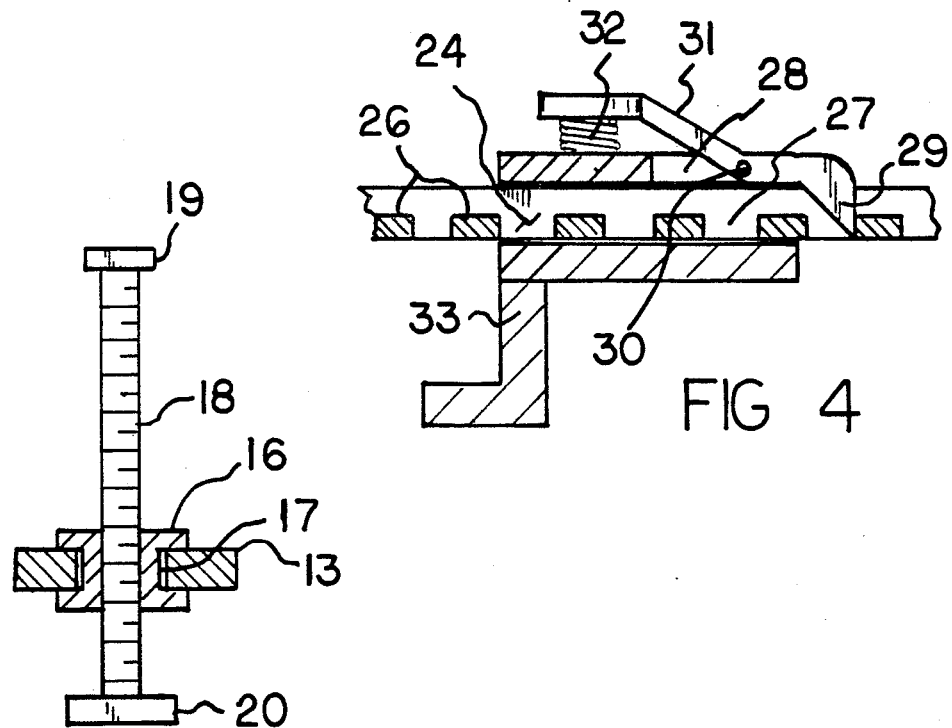
FIG 4
FIG 5

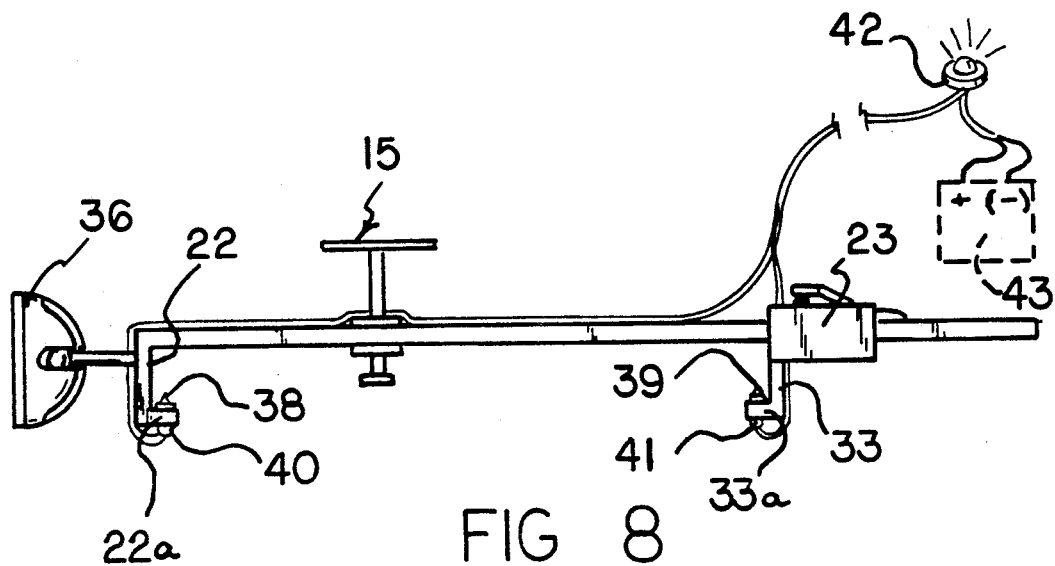
FIG 8
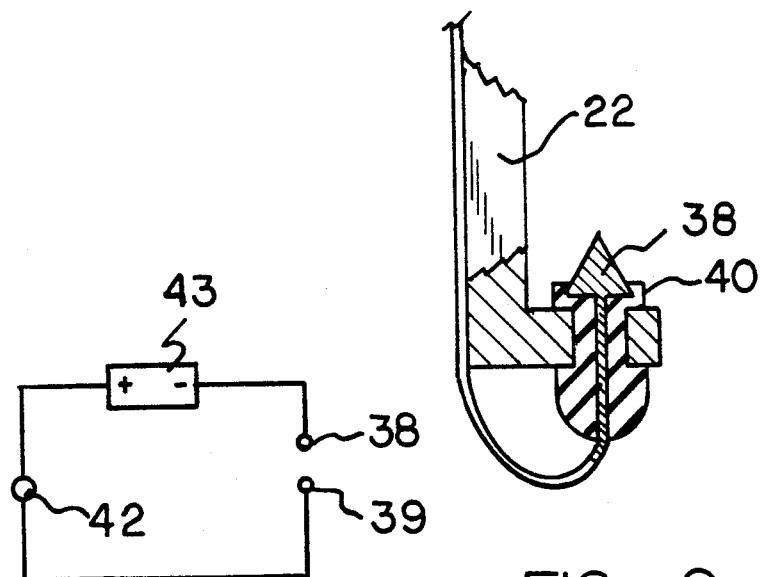
FIG 9
FIG 9A

DOME CLAMP APPARATUS

BACKGROUND OF THE INVENTION

1. Field of the Invention

The field of invention relates to clamp apparatus, and more particularly pertains to a new and improved dome clamp apparatus wherein the same is arranged for securement and clamping of the opening lids of an opening of a truck tank-trailer arrangement.

2. Description of the Prior Art

The structure of openings of a tank delivery type truck vehicle is subject to opening and spillage due to vibration and the like. The instant invention sets forth a safety clamp structure arranged to prevent such inadvertent opening. Prior art structure of a tank cover clamp is set forth in the U.S. Pat. No. 4,961,600 to Points, et al. addressing the same problem.

Various locking clamp structure of various types are set forth in the U.S. Pat. Nos. 4,912,949 and 4,949,946.

U.S. Pat. No. 3,665,946 to Robinson sets forth a truck tank safety valve clamp structure for latching of the valve structure of the tanker truck.

As such, it may be appreciated that there continues to be a need for a new and improved dome clamp apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of clamp apparatus now present in the prior art, the present invention provides a dome clamp apparatus wherein the same utilizes confronting L-shaped legs slidably mounted in a relative relationship to a support beam to clamp the lid structure of a tanker trailer. As such, the general purpose of the present invention, which will be described subsequently in greater detail, is to provide a new and improved dome clamp apparatus which has all the advantages of the prior art clamp apparatus and none of the disadvantages.

To attain this, the present invention provides a dome clamp arranged for mounting to the lid plates of a truck tank trailer arrangement including a plurality of confronting L-shaped legs mounted to a support beam, with the support beam including a slot having a slot clamp slidably directed therethrough to provide for clamping of the structure to the lid plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dome clamp apparatus which has all the advantages of the prior art clamp apparatus and none of the disadvantages.

It is another object of the present invention to provide a new and improved dome clamp apparatus which may be easily and efficiently manufactured and marketed.

It is a further object of the present invention to provide a new and improved dome clamp apparatus which is of a durable and reliable construction.

An even further object of the present invention is to provide a new and improved dome clamp apparatus which is susceptible of a low cost of manufacture with regard to both materials and labor, and which accordingly is then susceptible of low prices of sale to the consuming public, thereby making such dome clamp apparatus economically available to the buying public.

Still yet another object of the present invention is to provide a new and improved dome clamp apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 2 in the direction indicated by the arrows.

FIG. 4 is an orthographic view of section 4, as set forth in FIG. 3.

FIG. 5 is an orthographic view, taken along the lines 5—5 of FIG. 3 in the direction indicated by the arrows.

FIG. 8 is an isometric illustration of the modified aspect of the invention, including an indicator alarm structure.

FIG. 9 is an orthographic view, partially in section, of section 9 as set forth in FIG. 8.

FIG. 10 is a diagrammatic illustration of circuitry utilized by the organization, as set forth in the FIGS. 8 and 9.

DESCRIPTION OF THE PREFERRED EMBODIMENT

Figure 1:
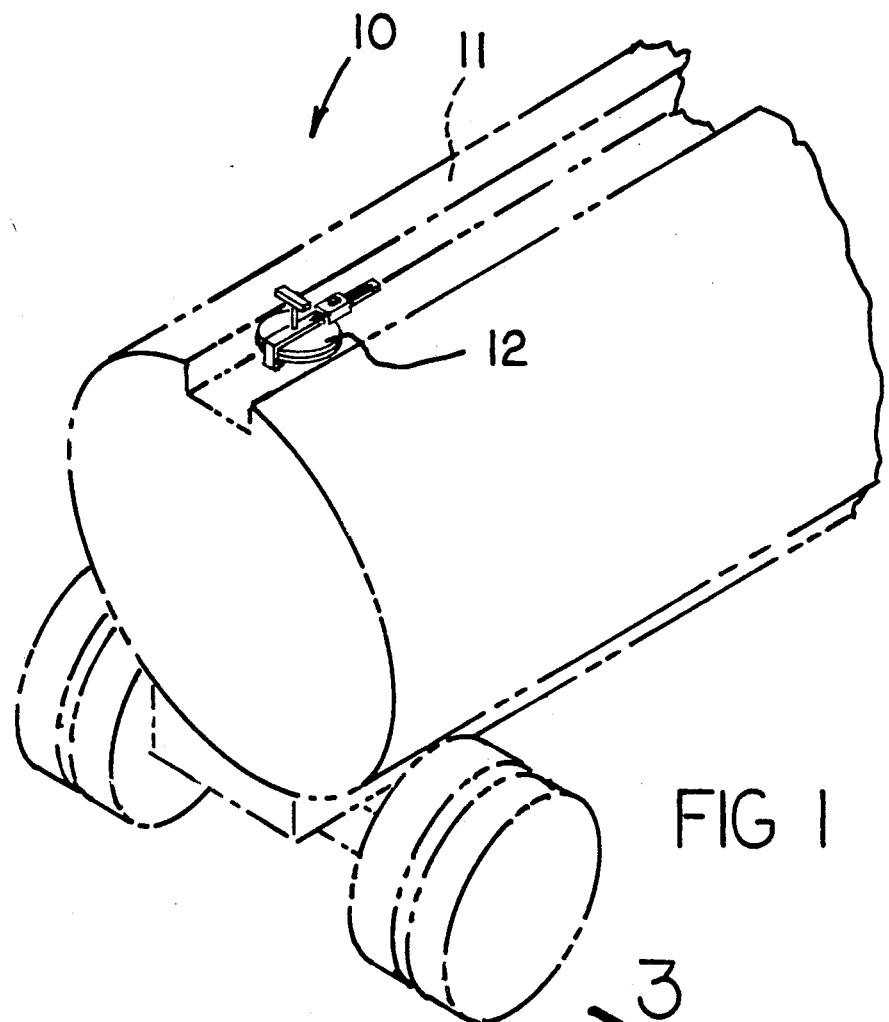
FIG. 1 is an isometric illustration of the instant invention in use.
Figure 2:
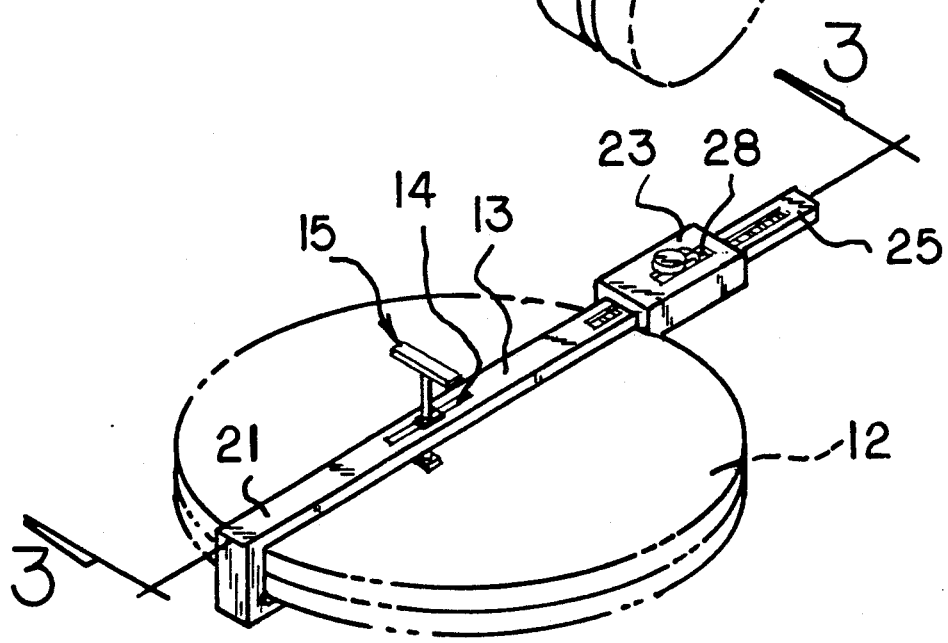
FIG. 2 is an enlarged isometric illustration of section 2, as set forth in FIG. 1.

With reference now to the drawings, and in particular to FIGS. 1 to 10 thereof, a new and improved dome clamp apparatus embodying the principles and concepts of the present invention and generally designated by the reference numerals 10 and 10a will be described.

More specifically, the dome clamp apparatus 10 of the instant invention essentially comprises securement to a tank truck-trailer arrangement 11 having trailer lid plates 12 cooperatively secured relative to one another arranged to receive the dome clamp apparatus 10 to secure the lid plates together to prevent their opening. An elongate support beam 13 has a support beam slot 14 directed therethrough. The slot is of an enclosed configuration spaced from the forward and rear end portions 21 and 25 respectively of the support beam. A slide clamp 15 is slidably mounted within the beam slot 14 having a slider disk 16 to include an annular groove 17 receiving and capturing the beam slot 14 therewithin. An externally threaded rod 18 is coaxially directed through the slider disk 16 orthogonally oriented relative to the support beam 13 and includes a rod handle 19 at an upper distal end thereof, and a rod foot plate 20 at a lower distal end thereof for abutment against the top surface of the lid plates 12 in use to latch the arrangement together relative to the lid plates. The support beam forward end portion 21 has an L-shaped forward end leg 22 fixedly mounted thereto extending below the support beam bottom surface of the elongate support beam 13. A tubular slide 23 is slidably mounted between the beam slot 14 and the support beam rear end portion 25 over a support beam groove 24 received within the tubular slide 23. The support beam groove 24 projects upwardly through a top surface of the support beam, with a plurality of spaced parallel groove ribs 26 mounted to a floor of the support beam groove 24. Rib slots 27 are positioned between adjacent ribs to receive an engagement foot 29 therewithin that is pivotally mounted about a pivot axle 30 that is mounted within a tubular slide slot 28 directed through a top wall of the tubular slide. The pivot axle includes a pivot axle lever plate 31 projecting above the tubular slide's top surface terminating in the lever plate capturing a lever plate spring 32 between the lever plate 31 and the tubular slide's top surface, in a manner as illustrated in FIG. 4, to bias the engagement foot 29 within one of the plurality of rib slots 27. In this manner, forward projecting of the tubular slide automatically effects engagement of the engagement foot 29 relative to one of the rib slots 27. The tubular slide includes a tubular slide L-shaped leg 33 mounted to a bottom surface of the tubular slide that is in confronting relationship relative to the L-shaped forward end leg 22 and is oriented in a substantially coextensive relationship thereto.

Figure 6:
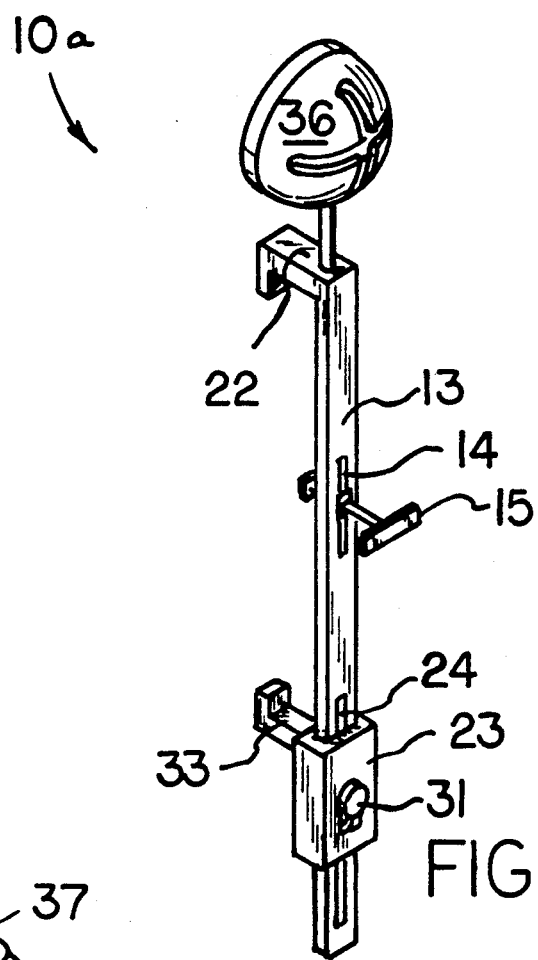
FIG. 6 is an isometric illustration of a modified aspect of the invention.
Figure 7:
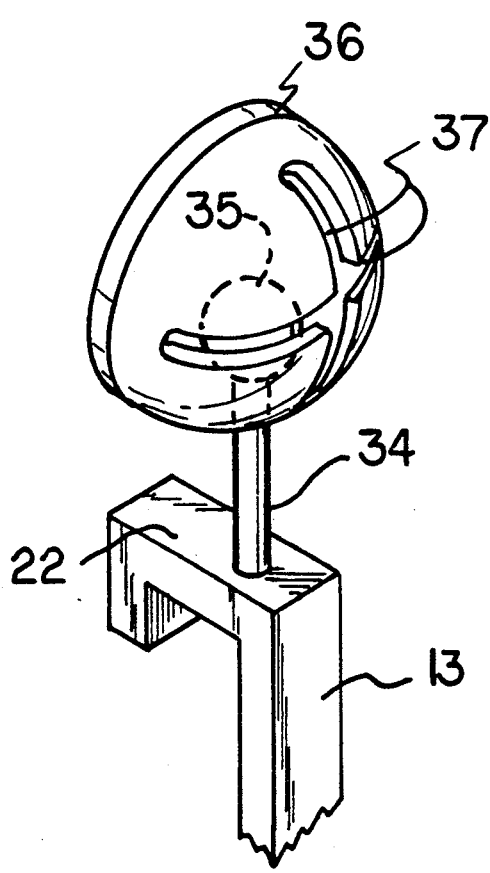
FIG. 7 is an enlarged isometric illustration of section 7, as set forth in FIG. 6.

The FIGS. 6 and 7 illustrate a modified apparatus 10a having a mounting rod 34 projecting longitudinally beyond the support beam 13 terminating in a spherical end 35 captured within a magnetic head 36, with the mounting rod 34 slidably received within crossed intersecting head grooves 37 within the magnetic head 36 to permit pivotment of the magnetic head 36 as desired relative to the support beam 13 to permit positioning of the magnetic head 36 and accordingly ease of storage of the organization to the trailer 11 when not secured to the lid plates 12.

The FIGS. 8 and 9 illustrate the invention further including first and second contact switches 38 and 39 directed through and projecting above respective first and second horizontal leg plates 22a and 33a of the respective L-shaped forward and slide L-shaped legs 22 and 33. In this manner, the first and second contact switches are arranged to effect electrical communication therebetween and provide for grounding electrically of the clamp structure, wherein a signal light 42 is in electrical communication with a battery 43 and accordingly, the first and second contact switches 38 and 39 effect electrical communication between the L-shaped legs 22 and 33 to permit continuous illumination of the signal light 42. In the event of inadvertent dislodgement of one or both of the contact switches 38 and 39 relative to the lid plates 12, the signal light 42 is extinguished. It should be further noted that the first and second contact switches 38 and 39 are directed through respective first and second insulative boots 40 and 41 to insulatively isolate the contact switches relative to the L-shaped legs 22 and 33.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dome clamp apparatus for securement to at least one lid plate of a truck-trailer structure comprises,
    an elongate support beam, the support beam including a support beam top surface and a support beam bottom surface, and
    a support beam forward end portion at a forward distal end of the support beam, and a support beam rear end portion at a rear distal end of the support beam, and
    an L-shaped forward end leg directed downwardly relative to the support beam bottom surface mounted at the support beam forward end portion, and a tubular slide mounted slidably receiving the support beam therethrough positioned adjacent the support beam rear end portion includes a slide top surface and a slide bottom surface, the slide bottom surface includes a slide L-shaped leg projecting downwardly therefrom in confronting relationship relative to the L-shaped forward end leg, and an elongate support beam slot positioned through the support beam between the support beam forward end portion and the support beam rear end portion, and a slot clamp orthogonally directed throughout the support beam slidably mounted within the slot projecting below the support beam and the support beam bottom surface, and the slot clamp includes a slider disk slidably mounted within the support beam slot, with the slider disk having an annular groove receiving spaced slot side wall of the support beam slot therethrough, and the slider disk includes an externally threaded rod coaxially directed through the slider disk, with the externally threaded rod orthogonally oriented relative to the support beam, with the externally threaded rod including a rod handle at an upper distal end of the externally threaded rod, and a rod foot plate at a lower distal end of the externally threaded rod.

2. An apparatus as set forth in claim 1 wherein the support beam includes a support beam groove directed through the support beam top surface between the support beam slot and the support beam rear end portion, the support beam groove includes a support beam groove floor having a plurality of spaced parallel groove ribs, wherein each plurality of adjacent groove ribs of said plurality of spaced groove ribs includes a rib slot therebetween, and a tubular slide slot is directed through the tubular slide through the slide top surface and includes an engagement foot pivotally mounted within the tubular slide slot directed below the tubular slide slot into the support beam groove for engagement with one of said rib slots, and the engagement foot including a pivot axle mounted within the tubular slide slot, and the engagement foot including a lever plate integral with the engagement foot extending above the tubular slide, and the lever plate including a lever plate spring captured between the lever plate and the tubular slide top surface to normally bias the engagement foot into one of said rib slots.

3. An apparatus as set forth in claim 2 including a mounting rod fixedly mounted and longitudinally aligned with the support beam forward end portion extending beyond the support beam forward end portion, with the mounting rod terminating in a spherical end, and a magnetic head, the magnet head including a plurality of crossed intersecting head grooves, with the spherical end positioned within the magnetic head, with the mounting rod slidably mounted within the head grooves permitting pivotment of the magnetic head relative to the mounting rod.

4. An apparatus as set forth in claim 3 wherein the L-shaped forward end leg includes a first horizontal leg plate, and the tubular slide L-shaped leg includes a second horizontal leg plate, a first contact switch directed through and extending above the first horizontal leg plate, and a second contact switch directed through and extending above the second horizontal leg plate, the first contact switch including a surrounding insulative boot, and the second contact switch including a surrounding second insulative boot, the first and second contact switches are in electrical communication with the signal light, with the signal light in electrical communication with a battery, whereupon engagement of the first horizontal leg plate and the second horizontal leg plate with the lid plate effects completion of electrical flow from the first contact switch to the second contact switch permitting illumination of the signal light.

* * * * *